(12) United States Patent
Wladimirow et al.

(10) Patent No.: US 9,789,787 B2
(45) Date of Patent: Oct. 17, 2017

(54) VEHICLE SEAT (71) Applicant: Brose Fahrzeugteile GmbH & Co. Kommanditgesellschaft, Coburg, Coburg (DE)

(72) Inventors: Katharina Wladimirow, Kueps (DE); Andreas Sorriento, Lichtenfels (DE); Lars Ellermann, Coburg (DE); Jochen Hofmann, Marktgraitz (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 81 days.

(21) Appl. No.: 14/783,700

(22) PCT Filed: Apr. 11, 2014

(86) PCT No.: PCT/EP2014/057340
§ 371 (c)(1),
(2) Date: Oct. 9, 2015

(87) PCT Pub. No.: WO2014/170216
PCT Pub. Date: Oct. 23, 2014

(65) Prior Publication Data
US 2016/0121758 A1    May 5, 2016

(30) Foreign Application Priority Data
Apr. 15, 2013    (DE) .......... 10 2013 206 688

(51) Int. Cl.
*B60N 2/02*    (2006.01)
*B60N 2/48*    (2006.01)
(Continued)

(52) U.S. Cl.
CPC .......... *B60N 2/0232* (2013.01); *B60N 2/206* (2013.01); *B60N 2/36* (2013.01); *B60N 2/2213* (2013.01); *B60N 2/2252* (2013.01); *B60N 2/2356* (2013.01)

(58) Field of Classification Search
CPC ........ B60N 2/0232; B60N 2/206; B60N 2/36; B60N 2/2213; B60N 2/2356; B60N 2/2252
(Continued)

(56) References Cited

U.S. PATENT DOCUMENTS 5,248,184 A * 9/1993 Morris ................. B60N 2/2231
                                                    297/362
5,435,624 A * 7/1995 Bray .................... B60N 2/0232
                                                    297/362
(Continued)

FOREIGN PATENT DOCUMENTS

CN    1576092    2/2005
CN    1692031    11/2005
(Continued)

OTHER PUBLICATIONS

CN First Office action dated Oct. 27, 2016 issued in corresponding CN Application No. 201480021170.6 dated Oct. 27, 2016, 7 pages, with English translation (7 pages).

*Primary Examiner* — Chi Q Nguyen
(74) *Attorney, Agent, or Firm* — Lewis Roca Rothgerber Christie LLP (57) ABSTRACT

A vehicle seat, in particular rear seat or rear bench, including a seat part, a backrest pivotally articulated to the seat part, whose position is variable between an upright seating or use position and a loading position folded forwards in direction of the seat part, a locking device arresting the backrest in the seating position, an unlocking device for unlocking the locking device for folding the backrest forwards from the (Continued)

seating position into the loading position, and an electromotive driving device for erecting the backrest from the loading position into the seating position. The unlocking device includes a manually actuatable release element and an electrically activatable unlocking means, so that electromotive erection or a fast manual erection of the backrest of a vehicle seat from the loading position into the upright seating is possible.

16 Claims, 5 Drawing Sheets (51) Int. Cl.
  *B60N 2/36* (2006.01)
  *B60N 2/20* (2006.01)
  *B60N 2/22* (2006.01)
  *B60N 2/235* (2006.01)
  *B60N 2/225* (2006.01)

(58) Field of Classification Search
  USPC ............ 297/378.12, 378.1, 330, 353, 378.11
  See application file for complete search history.

(56) References Cited

U.S. PATENT DOCUMENTS

| | | | | |
|---|---|---|---|---|
| 6,402,049 B1* | 6/2002 | Youngs, Jr. | ............ | A01G 25/165 239/69 |
| 6,540,295 B1 | 4/2003 | Saberan et al. | | |
| 7,500,719 B2 | 3/2009 | Kojima | | |
| 7,677,665 B2* | 3/2010 | Eppert | ................. | B60N 2/2252 297/362 |
| 7,775,594 B2* | 8/2010 | Bruck | .................. | B60N 2/0232 297/362 |
| 7,967,384 B2* | 6/2011 | Hille | .................. | B23K 15/0006 16/239 |
| 2002/0089223 A1 | 7/2002 | Yu | | |
| 2004/0036339 A1* | 2/2004 | Christoffel | ............. | B60N 2/206 297/367 R |
| 2005/0168035 A1 | 8/2005 | Boudinot | | |
| 2005/0264075 A1* | 12/2005 | Hofmann | .................. | B60N 2/20 297/367 R |
| 2006/0119158 A1* | 6/2006 | Haverkamp | ......... | B60N 2/3011 297/378.1 |
| 2007/0126272 A1 | 6/2007 | Deptolla | | |
| 2008/0296949 A1* | 12/2008 | Wieclawski | ........... | B60N 2/123 297/378.11 |
| 2011/0062737 A1 | 3/2011 | Kroener | | |
| 2011/0241400 A1* | 10/2011 | Ito | ........................ | B60N 2/1615 297/311 |
| 2012/0292972 A1* | 11/2012 | Hofmann | .................. | B60N 2/20 297/354.12 |
| 2016/0121758 A1* | 5/2016 | Wladimirow | ........ | B60N 2/0232 297/378.12 |

FOREIGN PATENT DOCUMENTS

| | | |
|---|---|---|
| DE | 94 00 639 U1 | 3/1994 |
| DE | 102 09 759 A1 | 9/2003 |
| DE | 102 95 374 T5 | 4/2004 |
| DE | 10 2004 041 738 B3 | 3/2006 |
| DE | 10 2008 047 671 A1 | 4/2010 |
| DE | 10 2005 058 367 C5 | 2/2012 |
| EP | 1 078 808 A1 | 2/2001 |
| EP | 1 764 260 A2 | 3/2007 |
| EP | 1 575 800 B1 | 8/2009 |
| WO | WO 2010/029010 A2 | 3/2010 |

* cited by examiner

VEHICLE SEAT

CROSS-REFERENCE TO A RELATED APPLICATION

This application is a National Phase Patent Application of International Patent Application Number PCT/EP2014/057340, filed on Apr. 11, 2014, which claims priority of German Patent Application Number 10 2013 206 688.0, filed on Apr. 15, 2013.

BACKGROUND

This invention relates to a vehicle seat, in particular a rear seat or a rear bench.

From EP 1 764 260 A1 a vehicle seat with a seat cushion and a backrest rotatably articulated to the rear end of the seat cushion is known, which backrest is variable between an upright condition and a condition folded forwards, in which it is inclined and folded towards the seat cushion or put over the seat cushion. A pretensioning means formed as spring exerts a force on the backrest in direction of the condition folded forwards, wherein a retaining mechanism arrests the backrest in the upright condition. An actuating element releases the retaining mechanism upon actuation, so that by action of the force of the pretensioning means the backrest is transferred into the condition folded forwards.

For rotating the backrest about its articulation at the rear end of the seat cushion, an electric motor activatable by means of a driver circuit is provided, with which the backrest can be guided back from the condition folded forwards into the upright condition.

Since folding up the backrest from the condition folded forwards into the predetermined, upright condition can be performed exclusively by means of the electric motor, the time period for folding up the backrest into the upright condition substantially depends on the power of the electric motor. For cost and space reasons small, high-speed electric motors usually are employed, which are connected with the backrest via a corresponding reduction gear for applying the required actuating force, so that folding up the backrest takes a frequently not accepted time period.

To carry out the tilt adjustment and folding down in an easy and convenient way in the case of an electromotive adjustment of a backrest, it is known from DE 102 09 759 A1 to vary the adjustment speed of the electromotive drive such that the inclination and adjustment function of the backrest is carried out with a slower speed than the folding function, so that at a slow speed the backrest inclination can be adjusted accurately, whereas the higher speed effects a fast execution of the folding function.

SUMMARY

It is an object underlying the present invention to selectively comfortably or quickly erect the backrest of a vehicle seat from a loading position folded forwards into an upright seating or use position.

The solution according to the invention selectively provides for a comfortable electric and/or electromotive or a fast manual erection of the backrest of a vehicle seat from a loading position folded forwards into an upright seating or use position.

The solution according to the invention thus provides for a comfort function in which the erection of the backrest from the loading position into the seating or use position is carried out by an electromotive driving device. For this purpose, it merely is required to actuate a control element integrated for example into the dashboard of a motor vehicle. Since the electromotive erection of the backrest however is effected comparatively slowly, a fast manual erection of the backrest from the loading position into the seating or use position is provided in the alternative, without acting on the electromotive driving device.

Both during the manual and during the electromotive erection of the backrest from the loading position into the seating or use position a pretensioning means can be tensioned and the backrest can be locked in the upright seating or use position, so that for folding the backrest forwards from the upright loading position into the seating or use position folded forwards the locking of the backrest is eliminated by actuating an unlocking means and the backrest is folded forwards. Alternatively, a pretensioning means can be omitted and the backrest can manually be folded down into the loading position.

The inventive solution to provide both a manual and an electromotive erection of the backrest becomes possible by decoupling the electromotive drive from the movement kinematics of the seat structure.

By decoupling the electromotive actuation of the erection of the backrest from a manual actuation on erection of the backrest it thus is possible to choose between the comfort function with electromotive actuation of the erection of the backrest and independent thereof the manual actuation for the fast erection of the backrest.

The electrically activatable unlocking means can be actuated either separate from the electromotive driving device for erecting the backrest from the loading position into the seating position for example by means of a relay, magnetic switch or the like or in a preferred embodiment by means of the electromotive driving device for erecting the backrest.

When using the electromotive driving device both for unlocking the backrest and for erecting the backrest from the loading position into the seating or use position, the electrically activatable unlocking means according to a preferred embodiment is actuated in the one direction of rotation of the driving device, whereas in the other direction of rotation of the electromotive driving device the backrest is erected from the loading position into the seating position.

Preferably, the unlocking device includes an unlocking lever rotatable about a lever axis with a control arm actuatable by means of the driving device and an unlocking arm releasing the locking device. Alternatively, the unlocking lever can be provided with a switching arm for manually unlocking the locking device, so that no additional actuating element is required for manually erecting the backrest from the loading position into the seating or use position by unlocking the locking device.

In a preferred embodiment, the unlocking arm rests against a locking pin of the locking device, which is guided in a locking link of the locking device, such that upon actuation of the unlocking device the locking pin is transferred from a locking position into an unlocking position for clearing the locking device.

After unlocking the locking pin, the unlocking arm is moved back into the starting position, while the locking pin remains in the unlocking position until the backrest is guided back into the seating position and is locked.

By unlocking the backrest locked in the seating position by means of the unlocking arm unilaterally resting against the unlocking pin and the independently effected return of the unlocking pin into the starting position by means of the lock locking the backrest in the seating position, the manual and the electromotive actuation of the backrest are decoupled from each other, so that both types of actuation are possible without the occurrence of functional overlaps.

The electromotive driving device contains an electric motor, a drive pinion connected with the electric motor, and a tooth segment meshing with the drive pinion, articulated to the seat part and pivotable about a tooth segment axis, from whose surface a control cam actuating the unlocking lever and an entraining element for erecting the backrest from the loading position into the seating or use position protrude, wherein the backrest is articulated to a backrest axle and is connected with a lifting device for erecting the backrest from the loading position into the seating or use position via a connecting tab articulation arranged at a distance from the backrest axle in folding direction of the backrest.

The lifting device consists of a lifting tab articulated to the seat part, which is engaged by the entraining element of the tooth segment for erecting the backrest from the loading position into the seating position, and a connecting tab which on the one hand is connected with the backrest via the connecting tab articulation and on the other hand is articulated to the lifting tab via a lifting bolt.

For pretensioning the upright backrest in direction of the loading position a pretensioning means can be provided, which preferably consists of a backrest spring acting between the seat part and the backrest.

BRIEF DESCRIPTION OF THE DRAWINGS

The invention will be explained in detail below with reference to an exemplary embodiment illustrated in the Figures of the drawing, in which further advantages and features of the invention are described in detail. The Figures of the drawing represent various phases of folding down and erecting the backrest of a vehicle seat.

DETAILED DESCRIPTION

Figure 1:
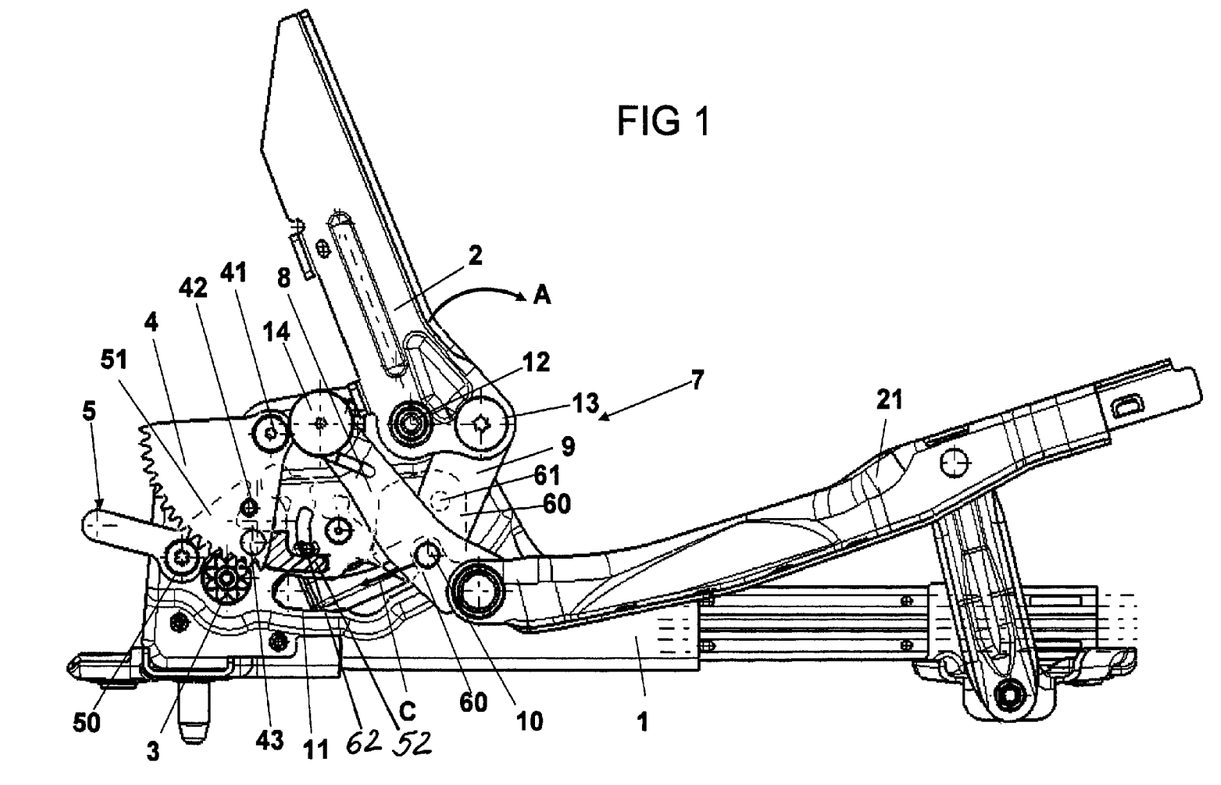
FIG. 1 shows a side view of the functional elements for the electromotive or manual erection of a backrest in its upright seating or use position.
Figure 4:
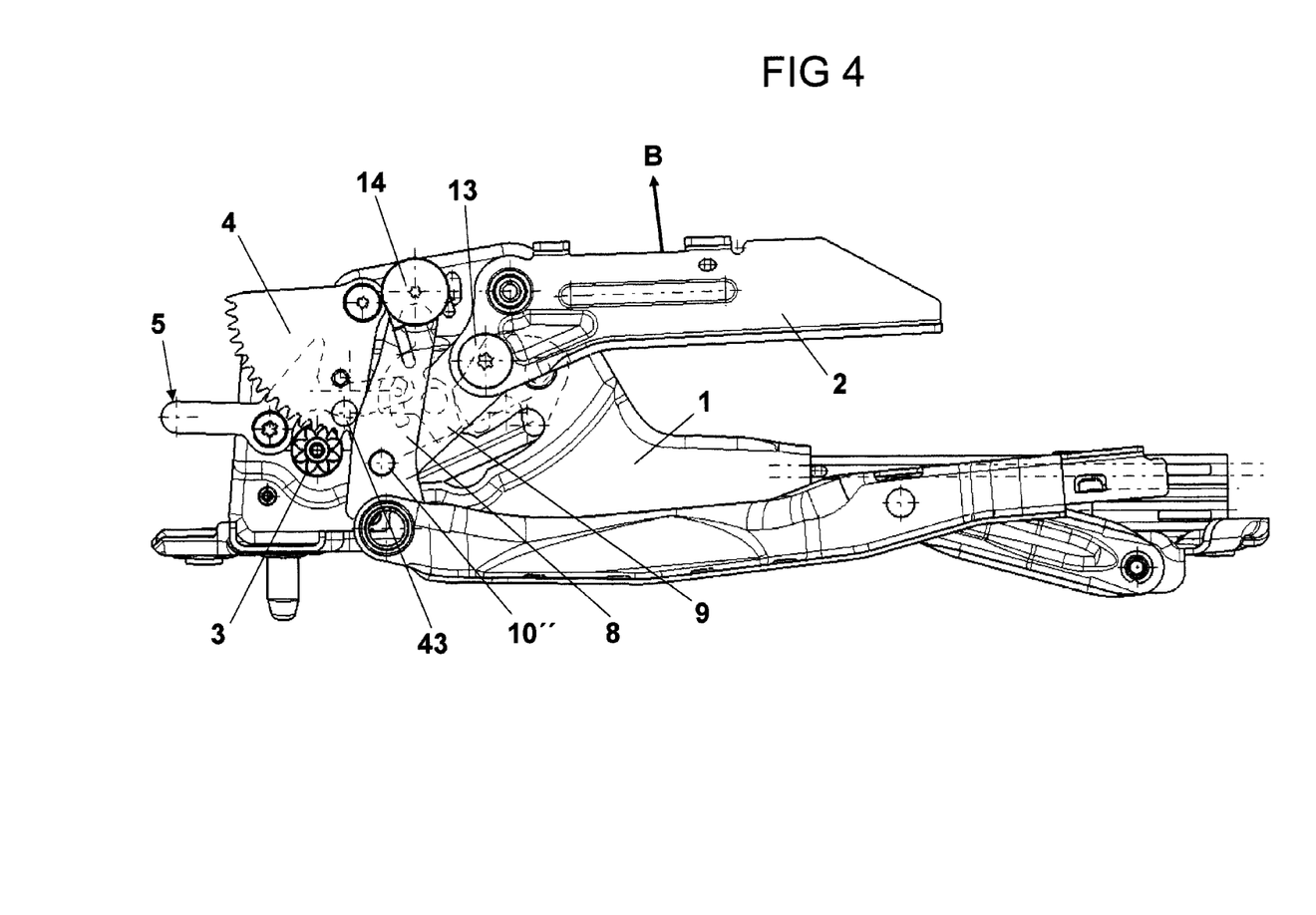
FIG. 4 shows a side view of the functional elements during the electromotive or manual erection of the backrest from the loading position into the seating or use position.

FIG. 1 shows a side view of a seat part 1 of a vehicle seat, in particular of a rear seat or a rear bench, comprising a seat pan 21 articulated to the seat part 1 via a seat part axle 20 and a backrest 2 articulated to the seat part 1, which can be folded forwards about a backrest axle 12 in direction of the arrow A plotted at the backrest 2 from an upright seating or use position as shown in FIG. 1 into a loading position as shown in FIG. 4. In the loading position the backrest 2 rests on the seat cushion of the seat part 1 and is aligned horizontally to increase a storage space of the motor vehicle.

In the seating or use position of the backrest 2 as shown in FIG. 1, in which a vehicle occupant can sit down on the vehicle seat, the backrest 2 is pretensioned in direction of the arrow A, i.e. in forward folding direction, by means of a pretensioning means in direction of the loading position. The pretensioning means preferably consists of a non-illustrated backrest spring, which supports both on the seat part 1 and on the backrest 2.

Folding the backrest 2 forwards from the upright seating or use position into the loading position folded forwards by action of the backrest spring is prevented by a locking device in the form of a latch 60 of a lock 6 shown in broken lines, which in the upright seating or use position blocks a lifting device 7 which is connected both with the seat part 1 and with the backrest 2. The lifting device 7 consists of a lifting tab 8 which is articulated to the seat part 1 via a lifting tab articulation 14, a connecting tab 9 which is articulated to the backrest 2 via a connecting tab articulation 13, and a lifting bolt 10 which connects the lifting tab 8 with the connecting tab 9. The lifting bolt 10 is trapped and blocked or released by the latch 60 and on actuation of the locking device moves along an oblong hole 11 in the seat part 1.

The latch 60 of the lock 6, which is pivotable about a lock axle 61 articulated to the seat part 1, protrudes into the oblong hole 11 and blocks the lifting bolt 10 in direction of the arrow C plotted at the lifting bolt 10, so that the backrest 2 pretensioned in forward folding direction is locked in the upright seating or use position as shown in FIG. 1.

Figure 2:
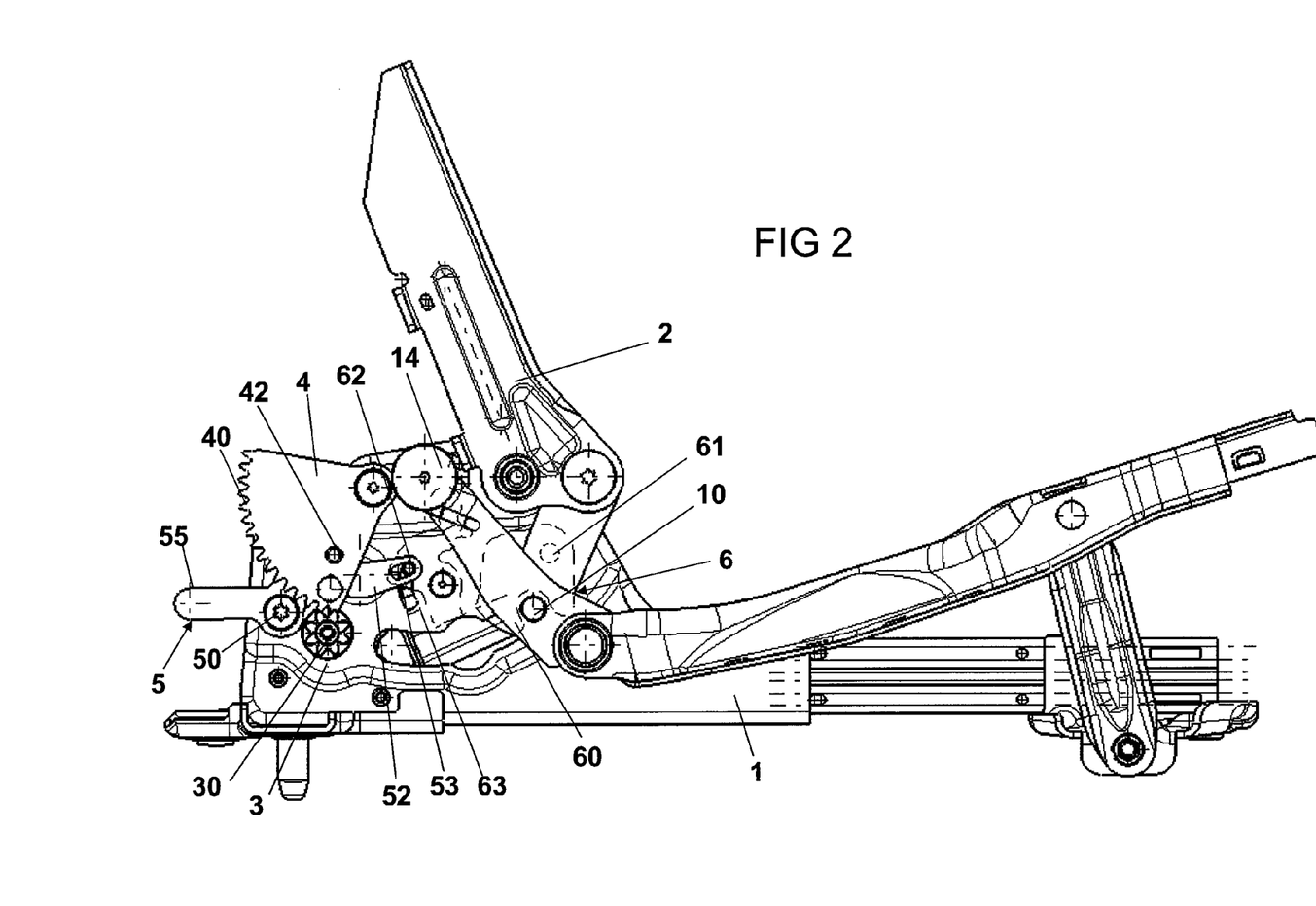
FIG. 2 shows a side view of the functional elements when manually or electrically unlocking the locking device for enabling folding down of the backrest from the upright seating or use position into the loading position.

For locking and unlocking the lock 6 a control device is provided in the form of a locking pin 62 guided in a locking link 63 according to FIG. 2, rotatable about the lock axle 61 and operatively connected with the latch 60. For actuating the locking pin 62 an unlocking device is provided in the form of an unlocking lever 5 which is articulated to the seat part 1 via a lever axle 50 and includes a control arm 51 shown in FIG. 1 in broken lines, an unlocking arm 52 branching off from the control arm 51, which is shown in FIG. 2 and is shown hatched for better visibility, and a switching arm 55. In the starting position shown in FIG. 1, the unlocking arm 52 rests against the bottom side of the locking pin 62 of the lock 6 and can move the same in direction of the opposite end of the locking link 63 for unlocking the backrest 2 locked in the seating position.

An electromotive driving device includes a non-illustrated electric motor whose motor shaft is connected with a drive pinion 3. The pinion teeth 30 of the drive pinion 3 mesh with the segment teeth 40 of a tooth segment 4 which is pivotable about a tooth segment axle 41 articulated to the seat part 1. The tooth segment 4 includes a control cam 42 protruding from its surface and a bolt-shaped entraining element 43, the function of which will be explained in detail below with reference to FIGS. 2 to 5.

Figure 5:
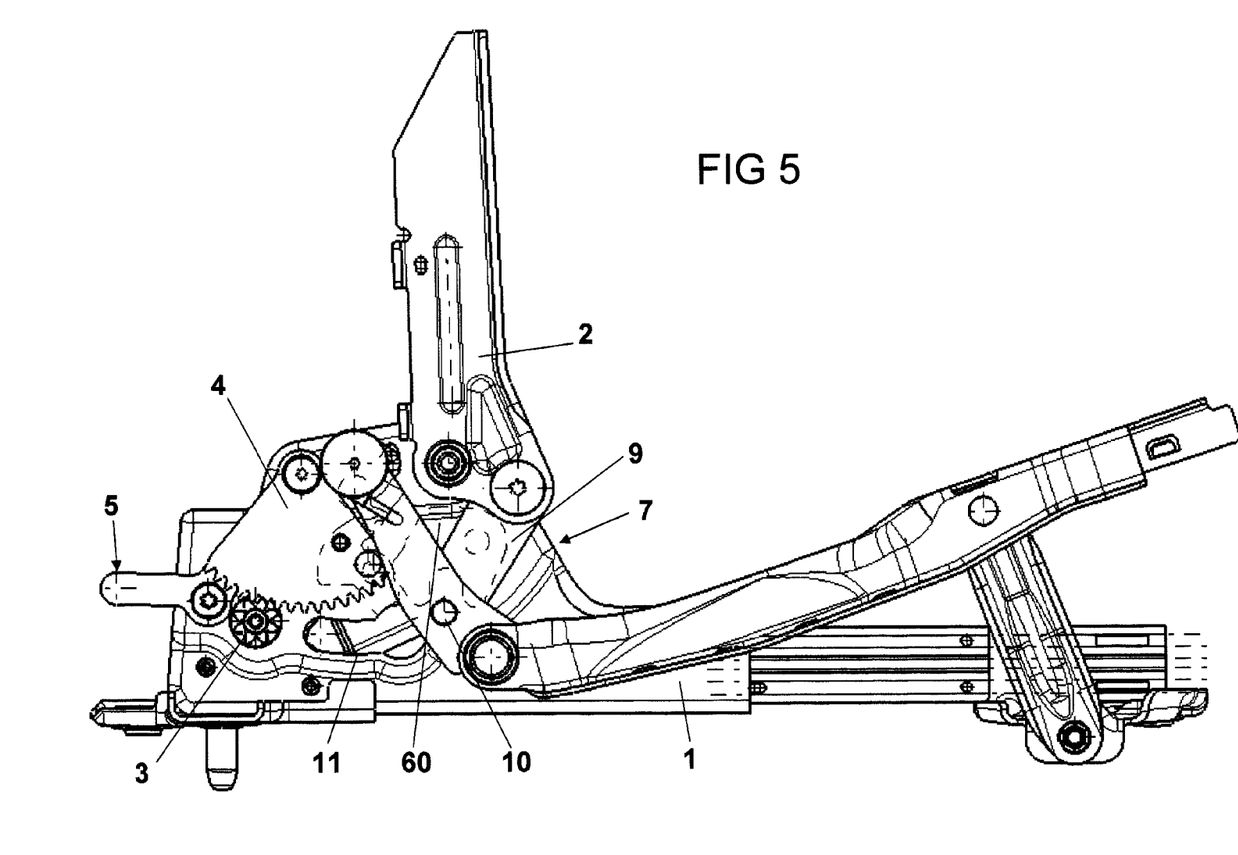
FIG. 5 shows a side view of the functional elements with the backrest electromotively or manually guided back into the starting position of the seating or use position, before locking the backrest in the seating or use position.

Folding the backrest 2 down from the upright seating or use position shown in FIG. 1 into the loading position shown in FIG. 4 possibly by action of a pretensioning means pretensioning the backrest 2 in direction of the arrow A according to FIG. 1 as well as the electromotively or manually actuated erection of the backrest 2 from the loading position shown in FIG. 4 via an intermediate position shown in FIG. 5 into the upright seating or use position shown in FIG. 1 will now be described below.

For folding the backrest 2 forwards from the seating or use position into the loading position the electromotive driving device will be initiated after actuation of a switching element proceeding from the upright seating or use position of the backrest 2 as shown in FIG. 1, so that the drive pinion 3 connected with the non-illustrated electric motor is rotated in anti-clockwise direction and the tooth segment 4 meshing with the pinion teeth 30 with its segment teeth 40 is pivoted in clockwise direction about the tooth segment axle 41. The control cam 42 of the tooth segment 4 thereby rests against the control arm 51 of the unlocking lever 5, so that the same rotates about the lever axle 50 in anti-clockwise direction and thereby likewise lifts the hatched unlocking arm 52 in anti-clockwise direction. The locking pin 62 of the lock 6 resting against the unlocking arm 52 thereby is moved into the upper end position within the locking link 63 as shown in FIG. 2, which is opposite to the end position of the locking pin 62 as shown in FIG. 1, in which the latch 60 blocks the lifting bolt 10.

By shifting the locking pin 62 into the upper end position, the latch 60 is pivoted about the lock axle 61, so that the lifting bolt 10 is released. In the unlocking position shown in FIG. 2, the lifting bolt 10 thus can move freely within the oblong hole 11, so that the backrest 2 for example can pivot about the backrest axle 12 by action of the pretensioning means and is folded forwards from the upright seating or use position into the loading position.

Figure 3:
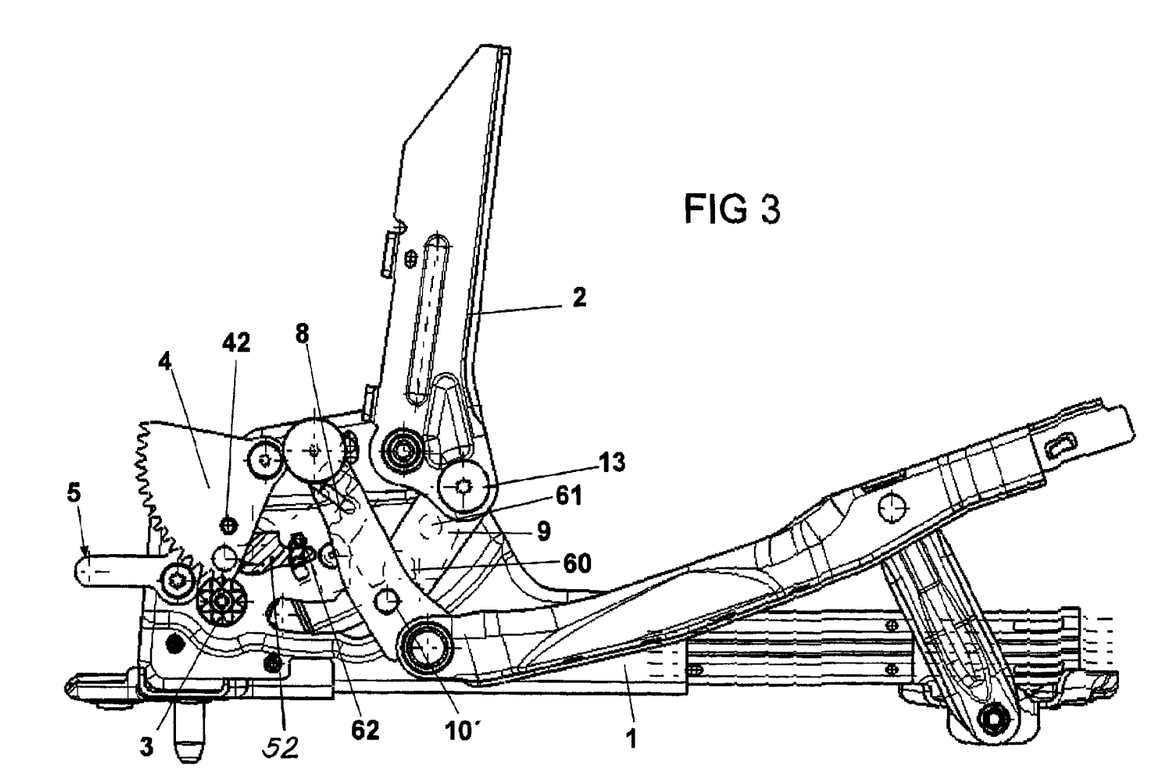
FIG. 3 shows a side view of the functional elements during folding down of the backrest after unlocking of the locking device.

FIG. 3 shows the beginning of folding the backrest 2 forwards after unlocking the lock 6 by means of the electromotive driving device and the unlocking lever 5 acting on the locking pin 62 and hence on the latch 60. The lifting bolt 10 is in an intermediate position 10' within the oblong hole 11, and the backrest 2 is slightly folded forwards with respect to the locked seating or use position according to FIG. 1.

After unlocking the lock 6, the direction of rotation of the electric motor of the electromotive driving device is reversed, so that the drive pinion 3 is rotated in clockwise direction and the tooth segment 4 meshing with the pinion teeth 30 with its segment teeth 40 thereby is swiveled in anti-clockwise direction back into its starting position according to FIG. 1 and entrains the unlocking lever 5 and hence the unlocking arm 52 into the starting position according to FIG. 1. Because of the unilateral abutment of the unlocking arm 52 against the locking pin 62, the locking pin 62 remains in the upper end position within the locking link 63 and the lock 6 remains opened. Only after setting the backrest 3 back into the locked seating position and the related closing of a latch of the lock 6 is the locking pin 62 connected with the lock 6 again set back into its starting position according to FIG. 1.

FIG. 4 shows the backrest 2 in the loading position folded forwards or in a position shortly before reaching the loading position folded forwards, in which the lever guide 10" has arrived in the region of the end of the oblong hole 11 opposite to the locking position. In this position, the backrest 2 rests on the seat cushion of the vehicle seat.

By again actuating the switching element for initiating the electromotive driving device the electric motor rotates the drive pinion 3 in clockwise direction, so that the tooth segment 4 meshing with the pinion teeth 30 with its segment teeth 40 is pivoted in anti-clockwise direction about the tooth segment axle 41, until the entraining element 43 connected with the tooth segment 4 rests against the flank of the lifting tab 8 and pivots the same in anti-clockwise direction about the lifting tab articulation 14. The lifting bolt 10 thereby is moved to the opposite end of the oblong hole 11 and with the same the connecting tab 9 is pivoted, which via the connecting tab articulation 13 erects the backrest 2 in direction of the arrow B according to FIG. 4.

During the erection of the backrest 2 as shown in FIG. 5 the lifting bolt 10 moves against the latch 60, which in the end position and seating or use position as shown in FIG. 1 snaps shut and again locks the lifting bolt 10 and hence arrests the backrest 2 in the seating or use position. The locking pin 62 thereby is again moved back into its starting position according to FIG. 1.

The locking pin 62 thus is moved by means of the same driving device for unlocking the backrest 2, which in the case of an electromotive actuation moves the backrest 2 from the loading position into the seating position. Independent thereof, the locking pin 62 however is again moved back into its starting position by the latch 60 snapping shut, when the backrest 2 is again erected into the seating position.

Folding the backrest 2 forwards also can be initiated without actuation of the electromotive driving device by means of a gearshift lever or pull handle arranged in the region of the driver seat or in the trunk, which for example via a connecting link such as a Bowden is connected with the switching arm 55 of the unlocking lever 5 and unlocks the lock 6. An actuation of the switching arm 55 also can be provided exclusively for folding the backrest 2 forwards during assembly and removal of the vehicle seat by an assembler or for emergency actuation.

After opening of the lock 6, folding the backrest 2 forwards proceeds as described above by manually folding the backrest 2 down from the seating or use position into the loading position or by action of a backrest spring tensioned during the preceding erection of the backrest 2 from the loading position into the seating or use position.

For manually erecting the backrest 2, the backrest 2 is erected from the folded loading position, in which the backrest 2 rests on the seat cushion of the vehicle seat with the lock 6 opened, by simple manual actuation in direction of the arrow B according to FIG. 4, wherein during the upward movement the lifting bolt 10 moves against the latch 60 of the lock 6, which in the end position with fully erected backrest 2 according to FIG. 1 snaps shut and arrests the lifting bolt 10. The backrest 2 thereby is blocked in the upright seating or use position and can again be folded forwards from the upright seating or use position into the loading position by unlocking the lock 6 manually or by action of the backrest spring.

The invention claimed is:

1. A vehicle seat, in particular rear seat or rear bench, comprising a seat part, a pivotable backrest whose position is variable between an upright seating or use position and a loading position folded down in a direction of the seat part, a locking device arresting the backrest in the upright seating position, an unlocking device for unlocking the locking device, and an electromotive driving device for erecting the backrest from the loading position into the upright seating or use position, wherein the backrest is erectable erected from the loading position into the upright seating position manually and via the electromotive driving device and wherein the unlocking device includes a manually actuatable release element and an electrically activatable unlocking mechanism so that an electromotive actuation of the erection of the backrest by the electromotive driving device is decoupled from a manual actuation of the erection of the backrest, thereby allowing electromotive actuation of the erection of the backrest and, independent thereof, manual actuation for the manual erection of the backrest.

2. The vehicle seat according to claim 1, wherein the electrically activatable unlocking mechanism is actuatable via the electromotive driving device.

3. The vehicle seat according to claim 2, wherein the electromotive driving device is configured to be activated in a first direction of rotation and in a second direction of rotation and wherein the electromotive driving device is configured to activate the unlocking mechanism in the first direction of rotation and is configured to erect the backrest from the loading position into the upright seating position in the second direction of rotation.

4. The vehicle seat according to claim 1, wherein the unlocking mechanism includes an unlocking lever rotatable about a lever axis with a control arm actuatable by the electromotive driving device and an unlocking arm configured to release the locking device.

5. The vehicle seat according to claim 4, wherein the unlocking lever includes a switching arm for manually unlocking the locking device.

6. The vehicle seat according to claim 4, wherein the unlocking arm rests against a locking pin of the locking device, the locking pin being in a locking link of the locking device such that upon actuation of the unlocking device the locking pin is transferred from a locking position into an unlocking position for releasing the locking device.

7. The vehicle seat according to claim 6, wherein after unlocking the locking pin the unlocking arm is configured to be moved back into a starting position and wherein the locking pin remains in the unlocking position until the backrest is guided back into the seating position and locked.

8. The vehicle seat according to claim 1, wherein the release element comprises a Bowden cable connected with the locking device and a switching element, upon whose actuation the locking device releases the backrest for folding down from the seating position into the loading position.

9. The vehicle seat according to claim 1, wherein the electromotive driving device includes an electric motor, a drive pinion connected with the electric motor, and a tooth segment meshing with the drive pinion, articulated to the seat part, and pivotable about a tooth segment axle, wherein a control cam for actuating the unlocking lever and an entraining element for erecting the backrest from the loading position into the seating position protrude from the tooth segment.

10. The vehicle seat according to claim 9, wherein the backrest is articulated to a backrest axle connected with the seat part and is connected with a lifting device for erecting the backrest from the loading position into the seating position via a connecting tab articulation arranged at a distance to the backrest axle in a folding direction of the backrest.

11. The vehicle seat according to claim 10, wherein the lifting device includes a lifting tab articulated to the seat part, wherein the lifting tab is configured to be engaged by the entraining element of the tooth segment for erecting the backrest from the loading position into the seating position, and a connecting tab which is connected with the backrest via the connecting tab articulation and which is articulated to the lifting tab via a lifting bolt.

12. The vehicle seat according to claim 11, wherein the lifting bolt extends through an oblong hole and is configured to cooperate with a latch of the locking device.

13. The vehicle seat according to claim 1, wherein the backrest is pretensioned in a direction of the loading position by a pretensioning mechanism.

14. The vehicle seat according to claim 13, wherein the pretensioning mechanism pretensioning the backrest into the loading position comprises a backrest spring acting between the seat part and the backrest.

15. A vehicle seat, in particular rear seat or rear bench, comprising a seat part, a pivotable backrest whose position is variable between an upright seating or use position and a loading position folded down in direction of the seat part, a locking device arresting the backrest in the upright seating position, an unlocking device for unlocking the locking device, and an electromotive driving device for erecting the backrest from the loading position into the seating or use position, wherein the unlocking device includes a manually actuatable release element and an electrically activatable unlocking mechanism, wherein the electromotive driving device includes an electric motor, a drive pinion connected with the electric motor and a tooth segment meshing with the drive pinion, articulated to the seat part, and pivotable about a tooth segment axle, wherein a control cam for actuating the unlocking lever and an entraining element for erecting the backrest from the loading position into the seating position protrude from the tooth segment, wherein the backrest is articulated to a backrest axle connected with the seat part and is connected with a lifting device for erecting the backrest from the loading position into the seating position via a connecting tab articulation arranged at a distance to the backrest axle in a folding direction of the backrest, wherein the lifting device includes a lifting tab articulated to the seat part, the lifting tab being configured to be engaged by the entraining element of the tooth segment for erecting the backrest from the loading position into the seating position, and a connecting tab which is connected with the backrest via the connecting tab articulation and which is articulated to the lifting tab via a lifting bolt.

16. A vehicle seat, in particular rear seat or rear bench, comprising a seat part, a pivotable backrest whose position is variable between an upright seating or use position and a loading position folded down in direction of the seat part, a locking device arresting the backrest in the upright seating position, an unlocking device for unlocking the locking device, and an electromotive driving device for erecting the backrest from the loading position into the seating or use position, wherein the unlocking device includes a manually actuatable release element and an electrically activatable unlocking mechanism, wherein the unlocking device includes an unlocking lever rotatable about a lever axis with a control arm actuatable by the electromotive driving device and an unlocking arm configured to release the locking device, wherein the unlocking arm rests against a locking pin of the locking device, the locking pin being in a locking link of the locking device such that upon actuation of the unlocking device the locking pin is transferred from a locking position into an unlocking position for releasing the locking device.

\* \* \* \* \*